(12) United States Patent  (10) Patent No.: US 8,777,273 B2
Syse et al.  (45) Date of Patent: Jul. 15, 2014

(54) STRUCTURE FOR A NESTED DUAL DRILL PIPE JOINT

(75) Inventors: Harald Syse, Royenberg (NO); Espen Alhaug, Stvanger (NO)

(73) Assignee: Reelwell, A.S., Royneberg (NO)

( * ) Notice: Subject to any disclaimer, the term of this patent is extended or adjusted under 35 U.S.C. 154(b) by 181 days.

(21) Appl. No.: 13/348,818

(22) Filed: Jan. 12, 2012

(65) Prior Publication Data
US 2013/0181438 A1 Jul. 18, 2013

(51) Int. Cl.
*F16L 19/00* (2006.01)
(52) U.S. Cl.
USPC .................. 285/123.3; 285/123.6; 285/123.9; 285/379
(58) Field of Classification Search
USPC .......... 285/123.3, 123.4, 123.5, 123.6, 123.7, 285/123.12, 123.14, 123.9, 123.11, 123.8, 285/338, 347, 379, 374
See application file for complete search history.

(56) References Cited

U.S. PATENT DOCUMENTS

| 1,869,739 | A | * | 8/1932 | Dean et al. ................. | 285/123.4 |
| 3,065,807 | A | * | 11/1962 | Wells .......................... | 285/123.3 |
| 3,208,539 | A | * | 9/1965 | Henderson ................. | 285/123.3 |
| 3,341,227 | A | * | 9/1967 | Pierce, Jr ................... | 285/123.4 |
| 3,438,657 | A | * | 4/1969 | Torres .......................... | 285/379 |
| 3,664,441 | A | * | 5/1972 | Carey .......................... | 285/123.3 |
| 3,664,443 | A | | 5/1972 | Campbell | |
| 3,786,878 | A | * | 1/1974 | Chapman ................... | 285/123.3 |
| 3,970,335 | A | * | 7/1976 | Curington et al. .......... | 285/123.3 |
| 3,998,479 | A | * | 12/1976 | Bishop ........................ | 285/123.3 |
| 4,012,061 | A | * | 3/1977 | Olson ......................... | 285/123.3 |
| 4,067,596 | A | * | 1/1978 | Kellner et al. ............. | 285/123.3 |
| 4,082,323 | A | * | 4/1978 | Wood et al. ................ | 285/123.3 |
| 4,229,027 | A | * | 10/1980 | Morrill ...................... | 285/123.3 |
| 4,632,406 | A | | 12/1986 | Akkerman | |
| 4,759,571 | A | | 7/1988 | Owen | |
| 4,928,999 | A | | 5/1990 | Landriault et al. | |
| 5,020,611 | A | | 6/1991 | Morgan | |
| 5,423,575 | A | | 6/1995 | Parks | |
| 5,913,336 | A | * | 6/1999 | Ingram ...................... | 285/123.3 |
| 7,152,700 | B2 | * | 12/2006 | Church et al. ............. | 285/123.3 |
| 2009/0189358 | A1 | | 7/2009 | Briscoe | |

FOREIGN PATENT DOCUMENTS

WO  03033955A1 A1  4/2003

OTHER PUBLICATIONS

Notification of Transmittal of the International Search Report and the Written Opinion of the International Searching Authority, or the Declaration, PCT/EP2013/050509, Dec. 2, 2013.

* cited by examiner

*Primary Examiner* — David E Bochna
(74) *Attorney, Agent, or Firm* — Richard A. Fagin

(57) ABSTRACT

A dual drill pipe joint includes a pin end and a box end. An inner pipe is disposed within an internal bore of the joint of drill pipe. A retainer is disposed proximate each longitudinal end of the inner pipe. A retaining feature is formed in an interior of the joint of drill pipe proximate each longitudinal end. The features are configured to engage a respective one of the retainers so that the inner pipe is held in longitudinally fixed relation to the joint of drill pipe.

19 Claims, 4 Drawing Sheets

STRUCTURE FOR A NESTED DUAL DRILL PIPE JOINT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The invention relates generally to the field of drill pipe used in drilling wellbores through subsurface formations. More particularly, the invention relates to "dual" drill pipe, in which two separate fluid conduits are provided within a single pipe extending from a drilling unit into a wellbore.

Dual drill pipe is disclosed, for example, in U.S. Pat. No. 3,208,539 issued to Henderson. Generally, dual drill pipe includes conventional, threadedly connected drill pipe, such as conforms to standards set by the American Petroleum Institute, Washington, D.C. An inner conduit or tube may be disposed in the interior of the conventional drill pipe to provide an additional fluid conduit. As explained in the Henderson '539 patent, the additional fluid conduit may be used to transport drill cuttings from a drill bit back to the surface during drilling operations. A possible advantage of using the additional conduit for such purpose is that the conduit has smaller cross-sectional area than an annular space between the exterior of the conventional drill pipe and the wall of the wellbore. Such smaller cross-sectional area enables higher drilling fluid velocity, thus requiring less drilling fluid flow to entrain the drill cuttings and return them to the surface. Another possible advantage of using the additional conduit for cuttings return is in drilling highly inclined wellbores. In such wellbores, cuttings tend to settle on the bottom of the wellbore, sometimes leading to "packing", and having the drill pipe become stuck in the wellbore as a result.

Dual drill pipe structures known in the art may require extended seal engagement features for the inner tube to be sealingly engaged between segments of the dual drill pipe. Dual dill pipe structures may also require expensive and difficult manufacturing techniques. There exists a need for improved structures for dual drill pipe.

SUMMARY

One aspect of the invention is a dual drill pipe including a joint of drill pipe having a pin end and a box end. An inner pipe is disposed within an internal bore of the joint of drill pipe. A retainer is disposed proximate each longitudinal end of the inner pipe. A retaining feature is formed in an interior of the joint of drill pipe proximate each longitudinal end. The features are configured to engage a respective one of the retainers so that the inner pipe is held in longitudinally fixed relation to the joint of drill pipe.

Other aspects and advantages of the invention will be apparent from the description and claims which follow.

DETAILED DESCRIPTION

Figure 1:
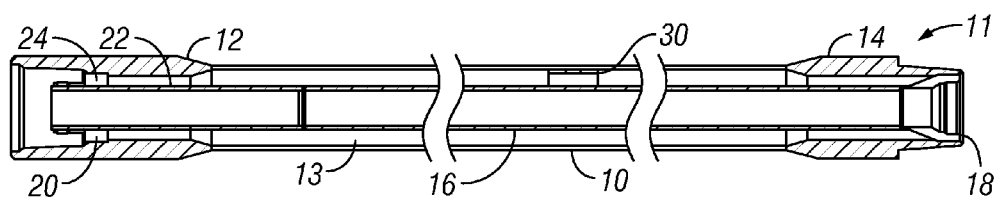
FIG. 1 shows an example of an assembled dual drill pipe segment according to the invention.

An example of a dual drill pipe according to the various aspects of the invention is shown in cut away view in FIG. 1. The dual drill pipe 11 may include a segment ("joint") 10 of "conventional" drill pipe, for example as made to industry standards set by the American Petroleum Institute, Washington, D.C. ("API") Conventional drill pipe may be threadedly connected end to end using API standard threaded couplings called "tool joints" disposed at each longitudinal end of the drill pipe joint 10. The couplings are typically referred to as a "box" or female threaded end, shown at 12 in FIG. 1, which threadedly engages and makes a sealed connection to a "pin" or male threaded end in an adjacent pipe joint. The pin end is shown at 14 in FIG. 1. An inner conduit or tube 16 may be disposed in the interior bore of the pipe joint 10. A tube retainer 18 may be affixed to one end of the inner tube 16. The tube retainer 18 may have an internal bore (explained further below) configured to sealingly engage the opposite end of the inner tube 16 wherein suitable sealing devices may be used to provide a pressure tight seal between adjacent segments of the inner tube 16, wherein such adjacent segment is included in an adjacent joint of the dual drill pipe 11. The opposite end of the inner tube 16 may include a device 20 to retain the inner tube 16 longitudinally fixed in the interior of the pipe joint 10. The device 20 may include passages 24 to enable fluid to be moved in an annular space 13 between the outer wall of the inner tube 16 and the inner wall of the pipe joint 10. A plurality of standoffs 30 may be affixed to the exterior wall of the inner tube at longitudinally spaced apart positions and at various circumferential orientations as will be explained further with reference to FIGS. 4A through 4F.

The inner tube 16 may be made from a material that has at least the same yield point as the material from which the pipe joint 10 is made.

Figure 2A:
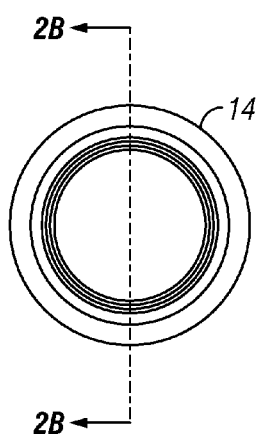
FIGS. 2A and 2B show, respectively, an end section and a side section of an example male (pin) end of conventional drill pipe modified to retain an inner tube.
Figure 2B:
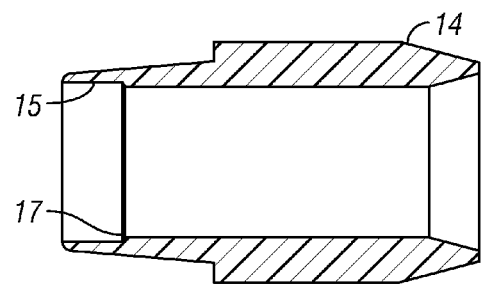

An example structure for the pin end tool joint 14 is shown in end view in FIG. 2A and in side cut away view in FIG. 2B. In FIG. 2B, the interior of the end of the male threaded coupling may include a retaining feature such as a generally cylindrically shaped receiving bore 15 ("pin end receiving bore") having a larger diameter than the nominal internal diameter of the pin end 14. The receiving bore 15 may extend longitudinally for a selected length to terminate in an internal shoulder 17, wherein the pin end 14 may be maintained at its nominal internal diameter. The shoulder 17 provides a positive stop for the tube retainer (18 in FIG. 1) when the inner tube (16 in FIG. 1) is inserted into the pipe joint (10 in FIG. 1).

Figure 3A:
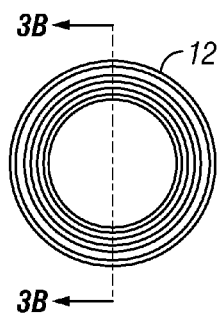
FIGS. 3A and 3B show, respectively, an end section and a side section of an example female (box) end of conventional drill pipe modified to retain an inner tube.
Figure 3B:
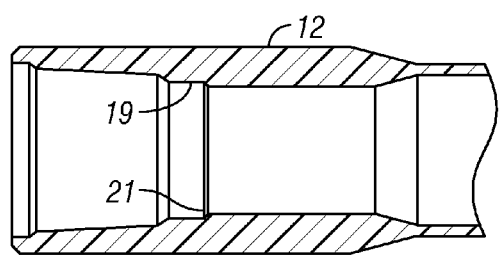

An example structure for the box end tool joint 12 is shown in end view in FIG. 3A and in cut away side view in FIG. 3B. In FIG. 3B, the longitudinally innermost portion of the threaded coupling may include a retaining feature such as a generally cylindrically shaped receiving bore 19 ("box end receiving bore") having a diameter larger than the nominal internal diameter of the tool joint 12 and that extends longitudinally into the tool joint for a selected length. The box end receiving bore 19, similar to the pin end receiving bore, terminates in a shoulder 21 where the nominal internal diameter of the tool joint 12 resumes. The shoulder 21 provides a positive stop for the retaining device (20 in FIG. 1).

Figure 4A:
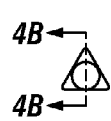
FIGS. 4A, 4C and 4E show end views of standoffs affixed to an inner tube.
Figure 4B:
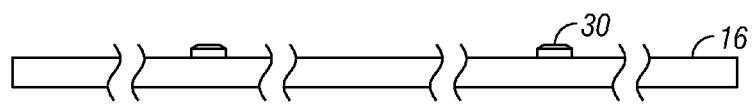
FIGS. 4B, 4D and 4F show side views of the standoffs affixed to the inner tube.
Figure 4C:
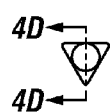
Figure 4D:
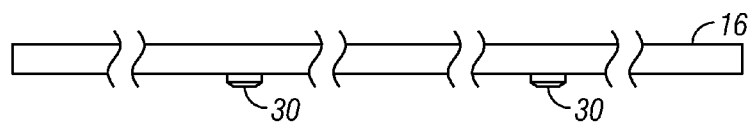
Figure 4E:
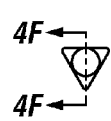
Figure 4F:
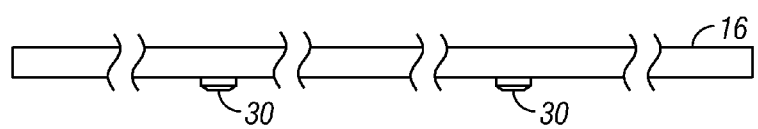

FIGS. 4A, 4C, and 4E show end views of the standoffs 30 as affixed to the exterior of the inner tube (16 in FIG. 1). The standoffs 30 may be affixed to the exterior of the tube in a helical pattern; for example longitudinally adjacent ones of the standoffs 30 may be circumferentially spaced apart by a selected angle. In the present example, the selected angle may be 120 degrees. FIGS. 4B, 4D and 4F show, respectively, the ones of the standoffs 30 oriented at zero degrees (FIG. 4B), 120 degrees (FIG. 4D) and 240 degrees (FIG. 4F). The height of the standoffs 30 may be selected to be longer than the lateral dimension of the annular space (13 in FIG. 1) that would exist if the inner tube 16 were concentric with the pipe joint (10 in FIG. 1). Thus, the height of the standoffs 30 may be selected to impart a slight bend to the inner tube 16 such that the inner tube 16 follows a helical path within the interior of the pipe joint (10 in FIG. 1).

Figure 5A:
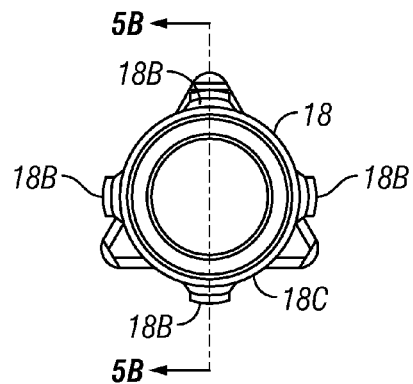
FIGS. 5A and 5B, show, respectively, an end view and a side section of a tube retainer/sealing device disposed in the modified pin end (FIGS. 2A and 2B) of the conventional drill pipe.
Figure 5B:
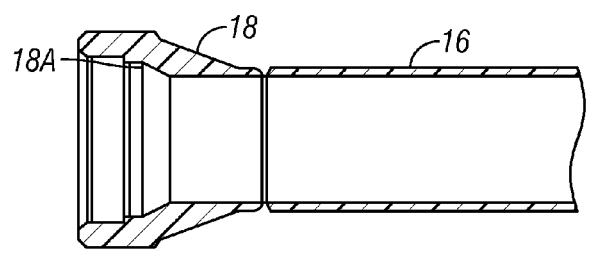

FIGS. 5A and 5B show, respectively, an end view and a cut away side view of the pin end retaining device 18. FIG. 5B shows that the device 18 may include a generally cylindrically shaped main body 18C with a plurality of circumferentially spaced apart protrusions 18B. The protrusions 18B subtend a diameter that may be approximately the same as the pin end receiving bore (15 in FIG. 2B). The protrusions 18B provide the pin end retaining device 20 with the capability of being longitudinally stopped by the shoulder (17 in FIG. 2B) while enabling fluid flow through the annular space (13 in FIG. 1). In FIG. 2B, the pin end retaining device 18 may be affixed to the inner tube 16 such as by welding. The pin end retaining device 18 may include a generally cylindrical inner bore 18A having a diameter selected to engage a seal assembly (FIG. 7) disposed on the opposed end of an adjacent segment of the inner tube. The pin end retaining device 18 inner bore 18 may have a taper in its internal diameter for engaging anti extrusion rings (FIG. 7) that hold a seal in the seal assembly, as will be further explained with reference to FIG. 7.

Figure 6:
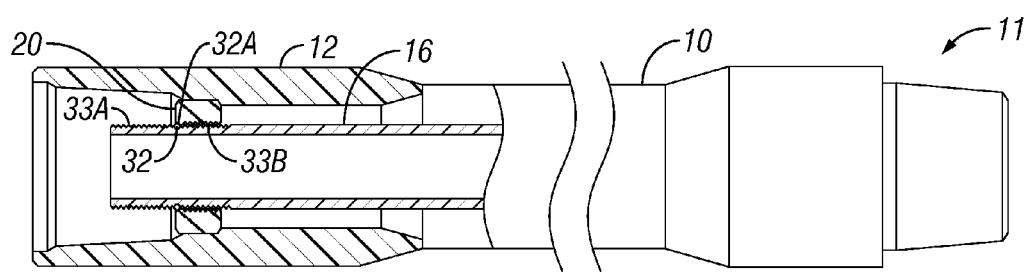
FIG. 6 shows a side view of a retaining ring disposed on the end of the inner tube engaged with the modified box end shown in FIGS. 3A and 3B.

FIG. 6 shows a sectional view of the dual drill pipe joint 11, in particular the box end inner tube retaining device 20. In the present example the box end retaining device 20 may be threadedly coupled to a corresponding thread formed at a selected distance from the longitudinal end of the inner tube 16. The box end retaining device 20 may thus be threadedly affixed to the inner tube 16. A snap ring or spiral locking ring 32 may be used to hold the box end retaining device 20 in place on the inner tube 16.

Assembling the joint of dual drill pipe 11 may include the following steps. The inner tube 16 may have the pin end retaining device 18 affixed to one longitudinal end thereof, such as, for example, by welding. The assembled inner tube 16, standoffs (30 in FIG. 4B, 4D, 4F) and pin end retaining device 18 may be inserted into the pipe joint (10 in FIG. 1) through the pin end tool joint (12 in FIG. 1) until the pin end retaining device 18 stops on the pin end shoulder (17 in FIG. 2B). The length of the inner tube 16 in the present example may be selected so that when no longitudinal stress is applied to the inner tube 16 the threads 33A for the box end retaining device 20 would be at a longitudinal position inside the tool joint beyond the box end shoulder (21 in FIG. 3B). Longitudinal tension may be applied to the inner pipe 16 so that the threads 33A for the box end retaining device 20 become accessible. The box end retaining device 20 may then be threaded 33B onto the exterior of the inner tube 16, and the locking ring 32 affixed to the inner tube 16. The longitudinal end of the box end retaining device 20 may include an internal bevel, groove or recess 32A on its internal diameter that covers the locking ring 32 by unthreading the box end retaining device 20 from the inner tube 16 until unthreading is stopped by the locking ring 32. Such configuration may provide increased reliability by preventing the locking ring 32 from disengaging from the inner tube 16. Tension may then be released from the inner tube 16 so that the box end retaining device 20 rests on the box end shoulder (21 in FIG. 3B). Thus, the inner tube 16 is retained in the pipe joint 10 so that the longitudinal ends of the inner pipe 16 are in substantially fixed relation with the longitudinal ends of the pipe joint 10. The height and configuration of the standoffs (30 in FIGS. 4B, 4D, 4F) cooperate with the tension retained in the inner tube 16 to provide stable bending of the inner tube 16 as the pipe joint 10 is bent during ordinary drilling operations and substantially prevents buckling of the inner tube 16. Tension may be retained in the inner tube 16 after the foregoing assembly procedure by suitable selection of the unstressed length of the inner tube 16.

Figure 7:
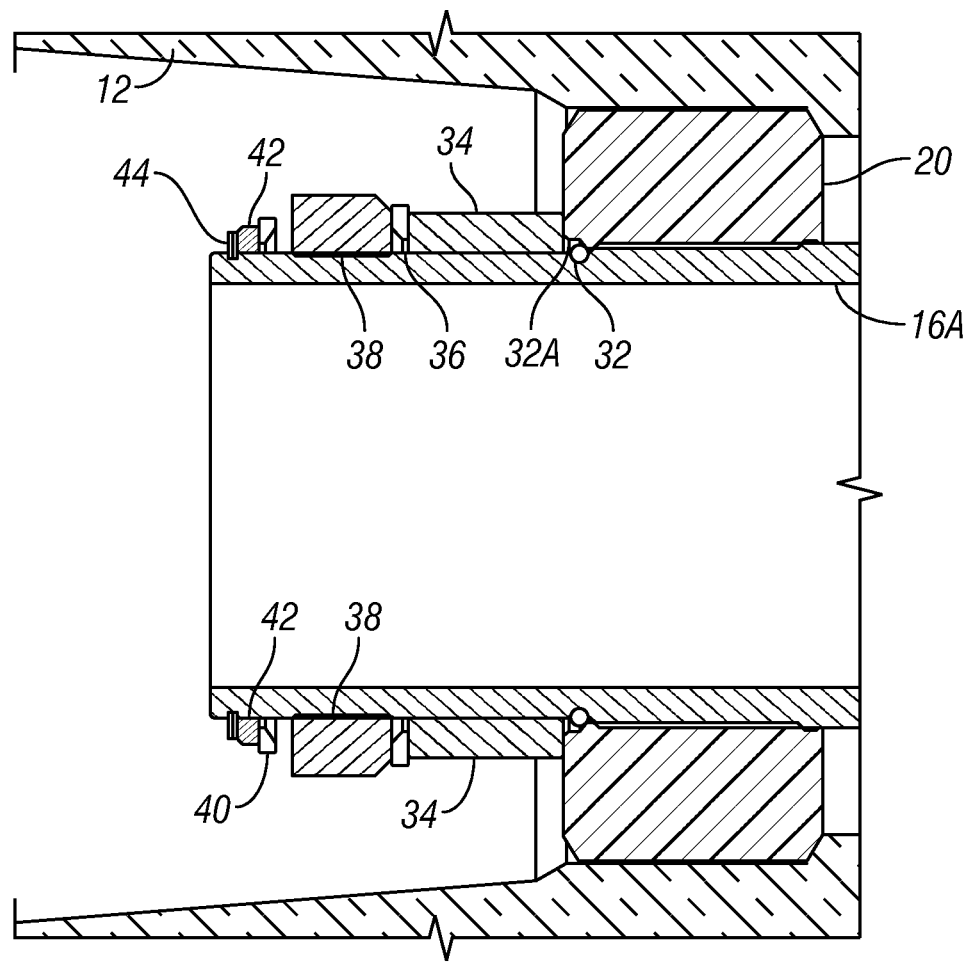
FIG. 7 shows an example seal assembly disposed on the end of the inner tube shown in FIG. 6.

After completion of the foregoing assembly procedure, and referring to FIG. 7, a seal assembly may be affixed to the end of the inner pipe 16 extending longitudinally outward (with reference to the box end) beyond the box end retaining device 20. The seal assembly may include a connector spacer 34 placed in contact with the box end retaining device 20 by sliding longitudinally along the inner tube 16. Next a first anti extrusion ring 36 may be applied to the end of the inner tube 16. A seal 38, which may be made from elastomer and be shaped substantially as an annular ring may be disposed on the inner tube 16 end. The seal 38 may be followed by a second anti extrusion ring 40. The second anti extrusion ring 40 may have a smaller diameter than the first anti extrusion ring 36 to cooperatively engage with the tapered inner surface (18A in FIG. 5B) of the pin end retaining device (18 in FIG. 5B). The second anti extrusion ring 40 may be followed by a spacer shim 42 as needed and a spiral or other type of locking ring 44 to hole the entire seal assembly as described longitudinally on the end of the inner tube 16.

When a joint of dual drill pipe configured and assembled as explained above is threadedly coupled to an adjacent joint of the dual drill pipe, the seal assembly shown in FIG. 7 sealingly engages the interior surface of the pin end retaining device 18 in the adjacent dual drill pipe joint. The box and pin end threads may be designed for metal to metal seal, or a separate sealing device (not shown) may be used to cause the pipe joints 10 to sealingly engage each other when threaded together. The shape and taper of the inner surface pin end retaining device (see FIG. 5B) may enable assembly of one pipe joint to the next using conventional drill pipe assembly techniques, in which the threads on the mating tool joints provide for a selected amount of axial misalignment during initial threading of the pin end to the box end.

It will be appreciated by those skilled in the art that pipe joint 10 may have retaining features formed so that the inner tube 16 mounts in the pipe joint 10 in a direction and with retainers as explained above disposed in the opposite longitudinal direction with respect to the example explained above.

It will also be appreciated by those skilled in the art that the example arrangement of a dual drill pipe, in which the inner tube is ordinarily in tension may be reconfigured so that the inner tube 16 is ordinarily in longitudinal compression. For example, the shoulder in either the pin end tool joint (14 in FIG. 1) or the box end tool joint (12 in FIG. 1) may be machined to stop the corresponding retaining device from exiting the respective tool joint longitudinally, rather than stopping the corresponding retaining device from entering the respective tool joint further. The opposed tool joint may have a suitable groove machined therein for a retaining ring such as a spiral locking ring or snap ring so that when the inner tube 16 is inserted into the pipe joint 10, after the respective retaining device stops on the corresponding shoulder, the inner pipe is compressed to enable insertion of the retaining ring. The uncompressed length of the inner pipe 16 may be selected so that when uncompressed, the snap ring groove is not accessible to retain the respective retaining device in the pipe joint 10.

A dual drill pipe according to the present invention may have one or more of the following advantages. The dual drill pipe may be assembled substantially identically to conventional drill pipe. The inner tube does not require extended length or specially configured seal surfaces because the ends of the inner tube may be in longitudinally fixed relationship with respect to the longitudinal ends of the pipe joint. The inner tube may be less susceptible to buckling or damage because of the helical shaped imposed thereon by the standoff configuration.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A dual drill pipe joint, comprising:
   a joint of drill pipe having a pin end and a box end;
   a one-piece inner pipe disposed within an internal bore of the joint of drill pipe;
   a retainer disposed proximate each longitudinal end of the inner pipe;
   a retaining feature formed in an interior of the joint of drill pipe proximate each longitudinal end, the retaining features configured to engage a respective one of the retainers so that the inner pipe is held in longitudinally fixed relation to the joint of drill pipe, at least one of the retainers removably affixable to the inner tube as the inner tube is placed in tension; and
   a plurality of longitudinally spaced apart standoffs disposed on an exterior surface of the inner tube, each standoff having a standoff dimension urging the inner tube out of axial alignment with the joint of drill pipe.

2. The dual drill pipe joint of claim 1 wherein a length of the inner pipe in a longitudinally unstressed state is selected so that engagement of the respective retainer with the respective feature places the inner pipe in at least one of longitudinal tension and longitudinal compression.

3. The dual drill pipe joint of claim 1 wherein the standoffs are circumferentially spaced apart from each other.

4. The dual drill pipe joint of claim 3 wherein the standoffs are arranged in a substantially helical pattern.

5. The dual drill pipe joint of claim 1 wherein the retainer disposed proximate the pin end comprises an inner sealing surface for engagement of a seal assembly adjacent the retainer disposed proximate the box end.

6. The dual drill pipe joint of claim 5 wherein the seal assembly comprises a seal ring and an anti extrusion ring disposed adjacent each longitudinal end of the seal ring.

7. The dual drill pipe joint of claim 6 wherein a longitudinally outermost part of the sealing surface with respect to the box end has a diameter less than longitudinally innermost part thereof.

8. The dual drill pipe joint of claim 7 wherein the inner sealing surface is formed to cooperate with respective anti extrusion rings.

9. The dual drill pipe joint of claim 5 wherein the retainer disposed proximate the pin end is welded to the inner tube.

10. The dual drill pipe joint of claim 1 wherein the retainer disposed proximate the box end is threadedly engaged to an outer surface of the inner tube.

11. The dual drill pipe joint of claim 10 further comprising a locking ring engaged with an outer surface of the inner tube and wherein the retainer disposed proximate the box end comprises a feature configured to cover the locking ring to prevent disengagement thereof from the inner tube.

12. A dual drill pipe joint, comprising:
    a joint of drill pipe having a pin end and a box end;
    an inner pipe disposed within an internal bore of the joint of drill pipe;
    a retainer disposed proximate each longitudinal end of the inner pipe;
    a retaining feature formed in an interior of the joint of drill pipe proximate each longitudinal end, the retaining features configured to engage a respective one of the retainers so that the inner pipe is held in longitudinally fixed relation to the joint of drill pipe;
    wherein the retainer disposed proximate the box end is threadedly engaged to an outer surface of the inner tube; and
    further comprising a locking ring engaged with an outer surface of the inner tube and wherein the retainer disposed proximate the box end comprises a feature configured to cover the locking ring to prevent disengagement thereof from the inner tube.

13. The dual drill pipe joint of claim 12 wherein a length of the inner pipe in a longitudinally unstressed state is selected so that engagement of the respective retainer with the respective feature places the inner pipe in at least one of longitudinal tension and longitudinal compression.

14. The dual drill pipe joint of claim 12 further comprising a plurality of longitudinally spaced apart standoffs disposed on an exterior surface of the inner tube, each standoff having a standoff dimension selected to urge the inner tube out of axial alignment with the joint of drill pipe.

15. The dual drill pipe joint of claim 14 wherein the standoffs are circumferentially spaced apart from each other.

16. The dual drill pipe joint of claim 14 wherein the standoffs are arranged in a substantially helical pattern.

17. A dual drill pipe joint, comprising:
    a joint of drill pipe having a pin end and a box end;
    a one-piece inner pipe disposed within an internal bore of the joint of drill pipe;
    a retainer disposed proximate each longitudinal end of the inner pipe;
    a retaining feature formed in an interior of the joint of drill pipe proximate each longitudinal end, the retaining features configured to engage a respective one of the retainers so that the inner pipe is held in longitudinally fixed relation to the joint of drill pipe, at least one of the retainers removably affixable to the inner tube as the inner tube is placed in tension;

wherein the retainer disposed proximate the pin end comprises an inner sealing surface that engages of a seal assembly adjacent the retainer disposed proximate the box end, and wherein the seal assembly comprises a seal ring and an anti extrusion ring disposed adjacent each longitudinal end of the seal ring.

18. The dual drill pipe joint of claim 17 wherein a length of the inner pipe in a longitudinally unstressed state is selected so that engagement of the respective retainer with the respective feature places the inner pipe in at least one of longitudinal tension and longitudinal compression.

19. The dual drill pipe joint of claim 17 further comprising a plurality of longitudinally spaced apart standoffs disposed on an exterior surface of the inner tube, each standoff having a standoff dimension selected to urge the inner tube out of axial alignment with the joint of drill pipe.

* * * * *